United States Patent
Vazquez et al.

(10) Patent No.: US 9,450,891 B2
(45) Date of Patent: Sep. 20, 2016

(54) SYSTEM AND METHOD FOR ENABLING G.HN NODES TO SUPPORT 1905.1 RELAYING (MAC RELAYING) WHILE SUPPORTING LEGACY G.HN RELAYING ACCORDING TO THE G.HN STANDARDS

(71) Applicant: Marvell World Trade Ltd., St. Michael (BB)

(72) Inventors: Marcos Martinez Vazquez, Barcelona (ES); John Egan, Palm Harbor, FL (US)

(73) Assignee: Marvell World Trade Ltd., St. Michael (BB)

( * ) Notice: Subject to any disclaimer, the term of this patent is extended or adjusted under 35 U.S.C. 154(b) by 157 days.

(21) Appl. No.: 14/184,004

(22) Filed: Feb. 19, 2014

(65) Prior Publication Data
US 2014/0233576 A1 Aug. 21, 2014

Related U.S. Application Data

(60) Provisional application No. 61/767,072, filed on Feb. 20, 2013.

(51) Int. Cl.
*H04L 12/947* (2013.01)
*H04L 12/66* (2006.01)

(52) U.S. Cl.
CPC .............. *H04L 49/25* (2013.01); *H04L 12/66* (2013.01)

(58) Field of Classification Search
None
See application file for complete search history.

(56) References Cited

U.S. PATENT DOCUMENTS

| | | | |
|---|---|---|---|
| 9,060,041 B2 | 6/2015 | Egan et al. | |
| 2005/0251604 A1 | 11/2005 | Gerig | |
| 2009/0196163 A1 | 8/2009 | Du | |
| 2009/0274153 A1 | 11/2009 | Kuo et al. | |
| 2012/0307659 A1 | 12/2012 | Yamada | |
| 2013/0325965 A1* | 12/2013 | Egan et al. | 709/204 |
| 2014/0204775 A1* | 7/2014 | Huang et al. | 370/252 |

FOREIGN PATENT DOCUMENTS

| | | |
|---|---|---|
| WO | WO-2008/0013429 A2 | 1/2008 |
| WO | WO-2009/0061677 A1 | 5/2009 |

OTHER PUBLICATIONS

Notification of Transmittal of the International Search Report and the Written Opinion of the International Searching Authority, or the Declaration dated Apr. 16, 2014 in reference to PCT/US14/17323 (13 pgs).

(Continued)

*Primary Examiner* — Hicham Foud (57) ABSTRACT

A device including a first node configured to communicate, over a first connection, with a second node and a third node in a network. The first node includes a first network layer associated with a first communication domain. The first communication domain corresponds to the first connection. A second network layer is associated with the first communication domain and a second communication domain. The first communication domain and the second communication domain are different. The first network layer is configured to receive, from the second node, a data packet to be relayed to the third node, in a first mode, forward the data packet to the third node, and in a second mode, selectively provide the data packet to the second network layer. The second network layer is configured to, in the second mode, forward the data packet to the third node.

12 Claims, 6 Drawing Sheets

(56) References Cited

OTHER PUBLICATIONS

IEEE Std 802.11ac/D3.0 "Draft Standard for Information Technology—Telecommunications and information exchange between systems—Local and metropolitan areanetworks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical andElectronics Engineers, Inc., Jun. 2012, 385 pages.
IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) andPhysical Layer (PHY) specifications: Amendment 4: Enhancements for Very High Throughput for Operation in Bands below 6 GHz," The Institute of Electrical and Electronics Engineers, Inc., Oct. 2012, 408 pages.
IEEE Std 802.11ac/D5.0 "Draft Standard for Information Technology—Telecommunications and information exchange between systems—Local and metropolitan area networks—Specific requirements, Part 11: Wireless LAN Medium Access Control (MAC) andPhysical Layer (PHY) specifications: Amendment 4: Enhancements for Very High Throughput for Operation in Bands below 6 GHz," The Institute of Electrical and Electronics Engineers, Inc., Jan. 2013, 450 pages.
IEEE Std 802.11ac/D6.0 "Draft Standard for Information Technology—Telecommunications and information exchange between systems—Local and metropolitan area networks—Specific requirements, Part 11: Wireless LAN Medium Access Control (MAC) andPhysical Layer (PHY) specifications: Amendment 4: Enhancements for Very High Throughput for Operation in Bands below 6 GHz," The Institute of Electrical and Electronics Engineers, Inc., Jul. 2013, 446 pages.
International Search Report and Written Opinion in corresponding application No. PCT/US2013/044127 mailed Aug. 23, 2013, 4 pages.
P1905.1/D05 Draft Standard for a Convergent Digital Home Network for Heterogeneous Technologies, IEEE P1905.1/D05, May 5, 2012, 90 pages.
ITU-T Draft OIS: G.hn: Outgoing Liaison to IEEE Nescom, Study Group 15, TD445 (WP1/15) Geneva, Switzerland, Feb. 14-25, 2011.
IEEE P1905.1.TM./D09, P1905.1TM/D0809 Draft Standard for a Convergent Digital Home Network for Heterogeneous Technologies, The Institute of Electrical and Electronics Engineers, Inc., Dec. 13, 2012, 99 pages.
IEEE P1905.1.TM.-2013, IEEE Draft Standard for a Convergent Digital Home Network for Heterogeneous Technologies, The Institute of Electrical and Electronics Engineers, Inc., Mar. 6, 2013, 90 pages.
International Standard, ISO/IEC 8802-11, ANSI/IEEE Std 802.11, "Information technology—Telecommunications and information exchange between systems—local and metropolitan area networks—specific requirements" Part 11: Wireless LAN Medium AccessControl (MAC) and Physical Layer (PHY) specifications, The Institute of Electrical and Electronics Engineers, Inc., (1999).
IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11:Wireless LAN Medium Access Control (MAC) and Physical Layer (PHY) specifications: High-Speed Physical Layer in the 5 GHZ Band," The Institute of Electrical and Electronics Engineers, Inc., 91 pages (1999).
IEEE Std 802.11a-1999 (R2003) (Supplement to IEEE Std 802.11-1999) "Supplement to IEEE Standard for Information technology—Telecommunications and information exchange between systems—Local and metropolitan area networks—Specificrequirements—Part 11: Wireless LAN Medium Access Control (MAC) and Physical Layer (PHY) specifications: High-Speed Physical Layer in the 5 GHZ Band," The Institute of Electrical and Electronics Engineers, Inc., (1999) Reaffirmed Jun. 12, 2003, 92 pages.
IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specificrequirements Part 11: Wireless Lan Medium Access Control (MAC) and Physical Layer (PHY) specifications: Higher-speed Physical Layer Extension in the 2.4 GHZ Band," The Institute of Electrical and Electronics Engineers, Inc., 1999, 96 pages.
IEEE Std 802.11b-1999/Cor 1-2001 (Corrigendum to IEEE Std 802.11b-1999) "IEEE Standard for Information technology—Telecommunications and information exchange between systems—Local and metropolitan area networks—Specific requirements, Part 11:Wireless LAN Medium Access Control (MAC) and Physical Layer (PHY) specifications, Amendment 2: Higher-speed Physical Layer (PHY) extension in the 2.4 GHz band-Corrigendum 1," The Institute of Electrical and Electronics Engineers, Inc., Nov. 7, 2001, 23 pages.
IEEE Std 802.11g/D2.8, May 2002 (Supplement to ANSI/IEEE Std 802.11, 1999 Edition) "Draft Supplement to Standard [for] Information technology—Telecommunications and information exchange between systems—Local and metropolitan areanetworks—Specific requirements—Part 11: Wireless LAN Medium Access Control (MAC) and Physical Layer (PHY) specifications: Further Higher-Speed Physical Layer Extension in the 2.4 GHz Band," The Institute of Electrical and Electronics Engineers, Inc., May 2002, 53 pages.
IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan areanetworks—Specific requirements, Part 11: Wireless LAN Medium Access Control (MAC) and Physical Layer (PHY) specifications: Further Higher Data Rate Extension in the 2.4 GHz Band," The Institute of Electrical and Electronics Engineers, Inc., Apr. 2003, 69 pages.
IEEE Std P802.11-REVma/06.0, "Unapproved Draft Standard for Information Technology—Telecommunications and information exchange between systems—Local and metropolitan area network—Specific requirements Part 11: Wireless LAN MediumAccess Control(MAC) and Physical Layer (PHY) specifications. (This document reflects the combining of the 2003 Edition of 802.11 plus the 802.11 g, 802.11 h, 802.11 i and 802.11j Amendments) (Revision of IEEE Std 802.11-1999) (Superseded by P802.11-REVma.sub.--D7.0),"2006.
IEEE Std 802.11-2007 (revision of IEEE Std. 802.11-1999) "Information Standard for Information technology—Telecommunications and information exchange between systems—Local and metropolitan area networks—Specific requirements" Part 11: WirelessLAN Medium Access Control (MAC) and Physical Layer (PHY) Specifications, The Institute of Electrical and Electronics Engineers, Inc., (Jun. 12, 2007), 1232 pages.
Chen, "Home Network Basis: Transmission Environments and WiredNVireless Protocols," Prentice Hall (Jul. 2003), 26 pages.
Hiertz, et al., "The IEEE 802.11 Universe," IEEE Communications Magazine, pp. 62-70, Jan. 2010.
S. A. Mujtaba, "IEEE P802.11—Wireless LANs, TGn Sync Proposal Technical Specification," The Institute of Electrical and Electronics Engineers, Inc., doc.: IEEE 802.11-04/0889r6, May 2005, 131 pages.
"IEEE P802.11n.TM./D3.00, Draft Standard for Information Technology—Telecommunications and information exchange between systems—Local and metropolitan area networks—Specific requirements, Part 11: Wireless LAN Medium Access Control (MAC) andPhysical Layer (PHY) specifications: Amendment 4: Enhancements for Higher Throughput," The Institute of Electrical and Electronics Engineers, Inc., Sep. 2007, 544 pages.
"IEEE Std. 802.11n.TM. IEEE Standard for Information Technology—Telecommunications and information exchange between systems—Local and metropolitan area networks—Specific requirements, Part 11: Wireless LAN Medium Access Control (MAC) and (56) References Cited

OTHER PUBLICATIONS

PhysicalLayer (PHY) Specifications: Amendment 5: Enhancements for Higher Throughput," The Institute of Electrical and Electronics Engineers, Inc., Oct. 2009, 535 pages.

van Nee, et al. "The 802.11n MIMO-OFDM Standard for Wireless LAN and Beyond," Wireless Personal Communications, vol. 37, pp. 445-453 (Jun. 2006).

Stacey et al., "IEEE P802.11, Wireless LANs, Proposed TGac Draft Amendment," Institute of Electrical and Electronics Engineers, doc. No. IEEE 802.11-10/1361r3 (Jan. 2011), 154 pages.

Stacey et al., "Specification Framework for TGac," document No. IEEE 802.11-09/0992r20, Institute for Electrical and Electronics Engineers, pp. 1-49, Jan. 18, 2011, 49 pages.

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) andPhysical Layer (PHY) specifications: Amendment 4: Enhancements for Very High Throughput for Operation in Bands below 6 GHz," The Institute of Electrical and Electronics Engineers, Inc., Jan. 2012, 359 pages.

IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) andPhysical Layer (PHY) specifications: Amendment 4: Enhancements for Very High Throughput for Operation in Bands below 6 GHz," The Institute of Electrical and Electronics Engineers, Inc., Mar. 2012, 363 pages.

Perahia, et al., "Gigabit Wireless LANs: an overview of IEEE 802.11ac and 80211ad," ACM SIGMOBILE Mobile Computing and Communications Review, vo. 15, No. 3, pp. 23-33, Jul. 2011.

IEEE Std 802.11v.TM./D14.0 "Draft Standard for Information technology—Telecommunications and information exchange between systems—Local and metropolitan area networks—Specific requirements" Part 11: Wireless LAN Medium Access Control (MAC) andPhysical Layer (PHY) specifications, Amendment 8: IEEE 802.11 Wireless Network Management the Institute of Electrical and Electronics Engineers, Inc., (Aug. 2010), 426 pages.

IEEE Std 802.3-2002, "IEEE Standard for Information technology—Telecommunications and information exchange between systems—Local and metropolitan area networks—Specific.requirements, Part 3: Carrier sense multiple access with collision detection(CSMA/CD) access method and physical layer specifications," The Institute of Electrical and Electronics Engineers, Inc., Mar. 8, 2002, 379 pages.

IEEE Std 802.Mar. 2005, "IEEE Standard for Information technology—Telecommunications and information exchange between systems—Local and metropolitan area networks—Specific requirements, Part 3: Carrier sense multiple access with collision detection(CSMA/CD) access method and physical layer specifications," The Institute of Electrical and Electronics Engineers, Inc. Sections 1-5, Dec. 9, 2005, 2695 pages.

IEEE Draft P802.3ae/D5.0 "Supplement to Carrier Sense Multiple Access with Collision Detection (CSMA/CD) Access Method & Physical Layer Specifications—Media Access Control (MAC) Parameters, Physical Layer, and Management Parameters for 10 Gb/sOperation," The Institute of Electrical and Electronics Engineers, Inc., May 1, 2002, 540 pages.

International Preliminary Report on Patentability in International Application No. PCT/US2013/044127, dated Dec. 9, 2014 (8 pages).

\* cited by examiner

SYSTEM AND METHOD FOR ENABLING G.HN NODES TO SUPPORT 1905.1 RELAYING (MAC RELAYING) WHILE SUPPORTING LEGACY G.HN RELAYING ACCORDING TO THE G.HN STANDARDS

CROSS-REFERENCE TO RELATED APPLICATIONS

This application claims the benefit of U.S. Provisional Application No. 61/767,072, filed on Feb. 20, 2013. The entire disclosure of the application referenced above is incorporated herein by reference.

FIELD

The present disclosure relates generally to data communications, and more particularly to systems and methods for controlling relaying of data packets in systems configured to communicate according to two or more different standards.

BACKGROUND

G.hn is a communication standard specifying a protocol for network communication over various communication mediums including, but not limited to, telephone wiring, power lines, coaxial cable, and plastic optical fiber. Networks that implement communication via the communication mediums typically associated with the G.hn standard may be associated with lower equipment costs, lower development costs, increased performance, and ease of installation. Further, devices such as computers, televisions, set-top boxes, standalone modems, and mobile devices may include communication interfaces configured to communicate using the G.hn standard.

IEEE 1905.1 is a networking standard corresponding to a layer configured to support different network communication protocols, such as various of wired communication protocols and wireless communication protocols (e.g., Wi-fi).

SUMMARY

A device including a first node configured to communicate, over a first connection, with a second node and a third node in a network. The first node includes a first network layer associated with a first communication domain. The first communication domain corresponds to the first connection. A second network layer is associated with the first communication domain and a second communication domain. The first communication domain and the second communication domain are different. The first network layer is configured to receive, from the second node, a data packet to be relayed to the third node, in a first mode, forward the data packet to the third node, and in a second mode, selectively provide the data packet to the second network layer. The second network layer is configured to, in the second mode, forward the data packet to the third node.

A method includes, in a first node located in a device, communicating over a first connection with a second node and a third node in a network. A first network layer is located in the first node and is associated with a first communication domain corresponding to the first connection. The method includes, using the first network layer, receiving a data packet from the second node to be relayed to the third node, in a first mode, forwarding the data packet to the third node, and, in a second mode, selectively providing the data packet to a second network layer. The second network layer is associated with the first communication domain and a second communication domain, and the first communication domain and the second communication domain are different. The method further includes, in the second mode, forwarding the data packet to the third node using the second network layer.

One or more potential advantages of particular implementations disclosed herein include allowing a 1905.1 layer to control the relaying of G.hn data packets.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

One or more devices in a network may be configured to operate according to two or more different communication protocols, such as the G.hn standard and a wireless standard such as a Wi-fi communication protocol. For example, devices in a home network may be connected via a G.hn (e.g., wired connections such as telephone wiring or coaxial cable) while also be connected via a non-G.hn connection (e.g., wirelessly via a wireless access point). Other devices in the home network may only be connected via one of the connection types.

The device may include a node in the home network that operates as a relay between two other nodes. For example, a first (source) node may transmit a data packet to a second (destination) node via a third (relay) node. For example, the source node and the destination node may correspond to devices including, but not limited to, mobile phones, tablet or laptop computers, personal computers, television set top boxes, gaming devices, etc. The relay node may correspond to an access point in one of the above-listed devices and/or a dedicated network device such as a router, repeater, or other relay device. For example, any device (such as a personal computer or other computing device) may operate as a relay node).

The source node may transmit the data packet to the destination node via a connection such as a connection configured according to the G.hn standard. For example, the source node may not be directly connected to the destination node via the G.hn connection, and/or may be unable to connect to the destination node via the non-G.hn connection (e.g., due to line-of-sight or other connectivity problems). Accordingly, the source node may transmit the data packet to the relay node via the G.hn connection, which relays the data packet to the destination node over the G.hn connection.

Each of the devices may correspond to devices operating according to the IEEE 1905.1 networking standard. Typically, when a relay node receives a data packet from a source node to be relayed to a destination node, only lower networking layers of the relay node (e.g., a physical layer and/or a data link layer) may be aware of the relay. In other words, the data packet may only enter the physical (PHY) layer or the data link layer (DLL) prior to being forwarded to the destination node. Upper networking layers of the node corresponding to the 1905.1 networking standard (e.g., a 1905.1 abstraction layer) may not be aware of the relay. Accordingly, the 1905.1 abstraction layer (AL) does not have control of the relaying functions of the relay node, and may be unaware of various information related to transmission of data packets in the home network (e.g., number of hops for data packets to complete transmission from the source node to the destination node, available bandwidth and/or bandwidth used, time to transmit data packets between nodes, and other network metrics).

In systems and methods according to the principles of the present disclosure, nodes are configured to operate in multiple modes to control how data packets are relayed between a source node and a destination node. For example, in a first mode, data packets to be relayed do not reach the AL of the relay node and the data packets are therefore relayed in the PHY layer. In a second mode, the data packets to be relayed do reach the AL of the relay node. In the second mode, the relay node may be configured to modify how a data packet will be relayed to the destination node. For example, in the G.hn standard, a data packet that originates in the G.hn domain remains in the G.hn domain until received by the destination node. The relay node according the principles of the present disclosure may receive the data packet from the source node via a G.hn connection and relay the data packet to the destination node via a different connection (e.g., a Wi-fi or other wireless connection).

Figure 1:
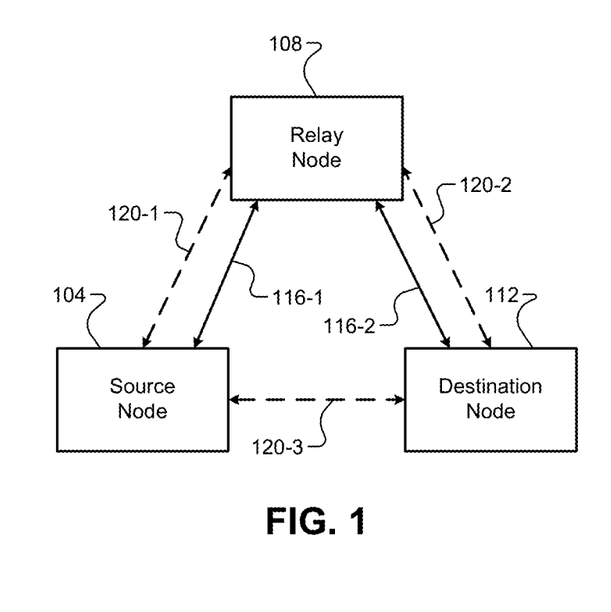
FIG. 1 is a functional block diagram of an example network including a source node, a relay node, and a destination node according to the principles of the present disclosure.

FIG. 1 shows an example network 100 including a source node 104, a relay node 108, and a destination node 112. The source node 104 is connected to the relay node 108 via a first connection 116-1 and the relay node 108 is connected to the destination node 112 via a second connection 116-2 (referred to collectively as connections 116). For example only, the connections 116 may correspond to G.hn wired connections, but the connections 116 may correspond to wireless connections implementing G.hn protocol. The source node 104 is connected to the relay node 108 via a first non-G.hn (e.g., Wi-fi) connection 120-1 and the relay node 108 is connected to the destination node 112 via a second non G.hn connection 120-2, while the source node 104 is connected to destination node 112 via only a connection 120-3 (referred to collectively as connections 120). In other words, the source node 104 may not be connected to the destination node 112 via a G.hn connection. For example only, the non-G.hn connections 120 may correspond to wireless connections, but may correspond to other non-G.hn wired connections.

The source node 104 may transmit a data packet to the relay node 108 via the G.hn connection 116-1, which relays the data packet to the destination node 112 over the G.hn connection 116-2 or the non-G.hn connection 120-2. For example, the relay node 108 may correspond to an access point. The relay node 108 is configured to operate in a first mode where the relay node 108 simply forwards the data packet received from the source node 104 directly to the destination node 112 according to a protocol associated with the G.hn connections 120 (e.g., using G.hn addressing in a G.hn domain). The relay node 108 is also configured to operate in a second mode where the relay node 108 creates a new data packet according to the protocol of the G.hn connections 120 (e.g., in a domain other than the G.hn domain, such as a 1905.1 layer).

For example, in the G.hn standard, a centralized entity (e.g., a domain master, which may correspond to the relay node 108 or another device in the network 100) distributes routing tables to each of the nodes 104, 108, and 112. The routing tables indicate which routing (e.g., relaying) actions a node performs upon receiving a data packet over one of the connections 120. For example, a received data packet may include a destination media access controller (MAC) address. Each MAC address is mapped to a corresponding node. For example, each node may translate the MAC address using internal G.hn addressing, which is used within the G.hn domain. Relaying in the G.hn domain is performed using the internal G.hn addressing, not in a MAC address layer. Conversely, relaying in the 1905.1 layer (i.e., in the second mode) is performed at the MAC address level. When operating in the second mode, one or more of the nodes 104, 108, and 112 modify a relay table associated with the routing table to forward data packets to be transferred to the 1905.1 domain (e.g., to an abstraction layer) of the relay node 108 prior to forwarding the data packets to the destination node 112.

Figure 2:
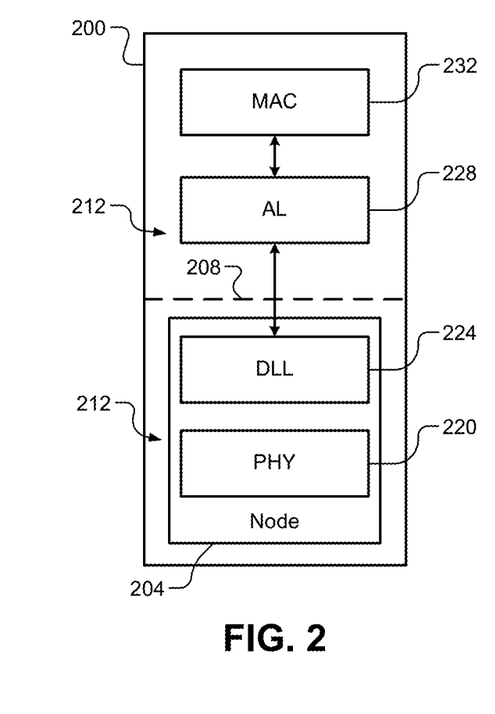
FIG. 2 is a functional block diagram of an example node and abstraction layer according to the principles of the present disclosure.

FIG. 2 shows an example device 200 (corresponding to, for example, the relay node 108). The device 200 includes a node 204. A first side of an abstraction layer interface 208 corresponds to a G.hn domain 212. Conversely, a second side of the abstraction layer interface 208 corresponds to a 1905.1 domain 216. The G.hn domain 212 includes a physical layer (PHY) 220 and a data link layer (DLL) 224. The 1905.1 domain 216 includes an abstraction layer (AL) 228. The device 200 may include other network layers and/or devices above the abstraction layer 228, and may be represented and/or addressed according to a media access control address 232.

In the first mode, data packets to be relayed by the node 204 are merely relayed to a destination node using components in the G.hn domain 212 of the node 204 (e.g., using the PHY 220/DLL 224). Accordingly, data packets relayed in the first mode are relayed according to the routing table provided by the domain master. Conversely, in the second mode, data packets to be relayed by the node 204 are passed to the abstraction layer 228 via the abstraction layer interface 208. Data packets relayed in the second mode may be relayed according to the routing table, as well as a relay table as modified by a device that transmitted the data packets to the device 200. In some implementations, the device 200 may relay selected data packets via a non-G.hn connection instead of the G.hn connection.

Figure 3:
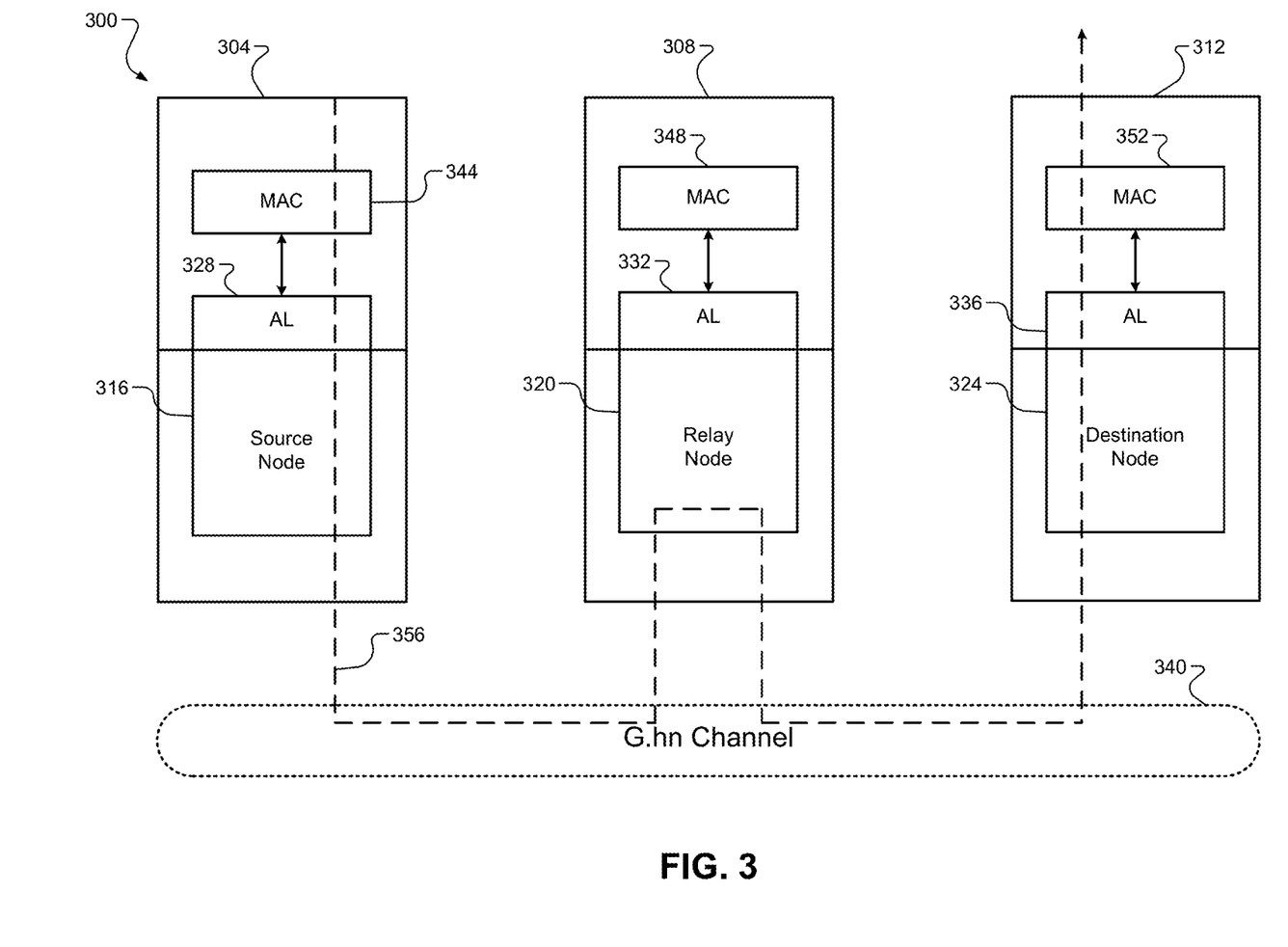
FIG. 3 illustrates a first example relay operation according to the principles of the present disclosure.

FIG. 3 shows an example network 300 including devices 304, 308, and 312, corresponding to a source node 316, a relay node 320, and a destination 324 node. Each of the devices 304, 308, and 312 is 1905.1 compliant and includes a corresponding abstraction layer 328, 332, and 336. In some implementations, one or more of the devices 304, 308, and 312 may not include an abstraction layer. The nodes 316, 320, and 324 communicate via a connection such as a G.hn channel 340. Each of the nodes 316, 320, and 324 has a corresponding MAC address 344, 348, and 352.

The relay node 320 is shown operating in a first mode. For example, a data packet 356 is transmitted by the device 304 via the source node 316. The relay node 320 of the device 308 receives the data packet 356 and relays the data packet 356 to the destination node 324. The relay node 320 relays the data packet 356 based on a destination node (e.g., as indicated by a MAC address in the data packet 356) and routing information corresponding to the destination MAC address stored in a relay table, which includes a routing table (e.g., as provided by a domain master). As shown, the data packet 356 does not reach the abstraction layer 332 of the relay node 320.

Figure 4:
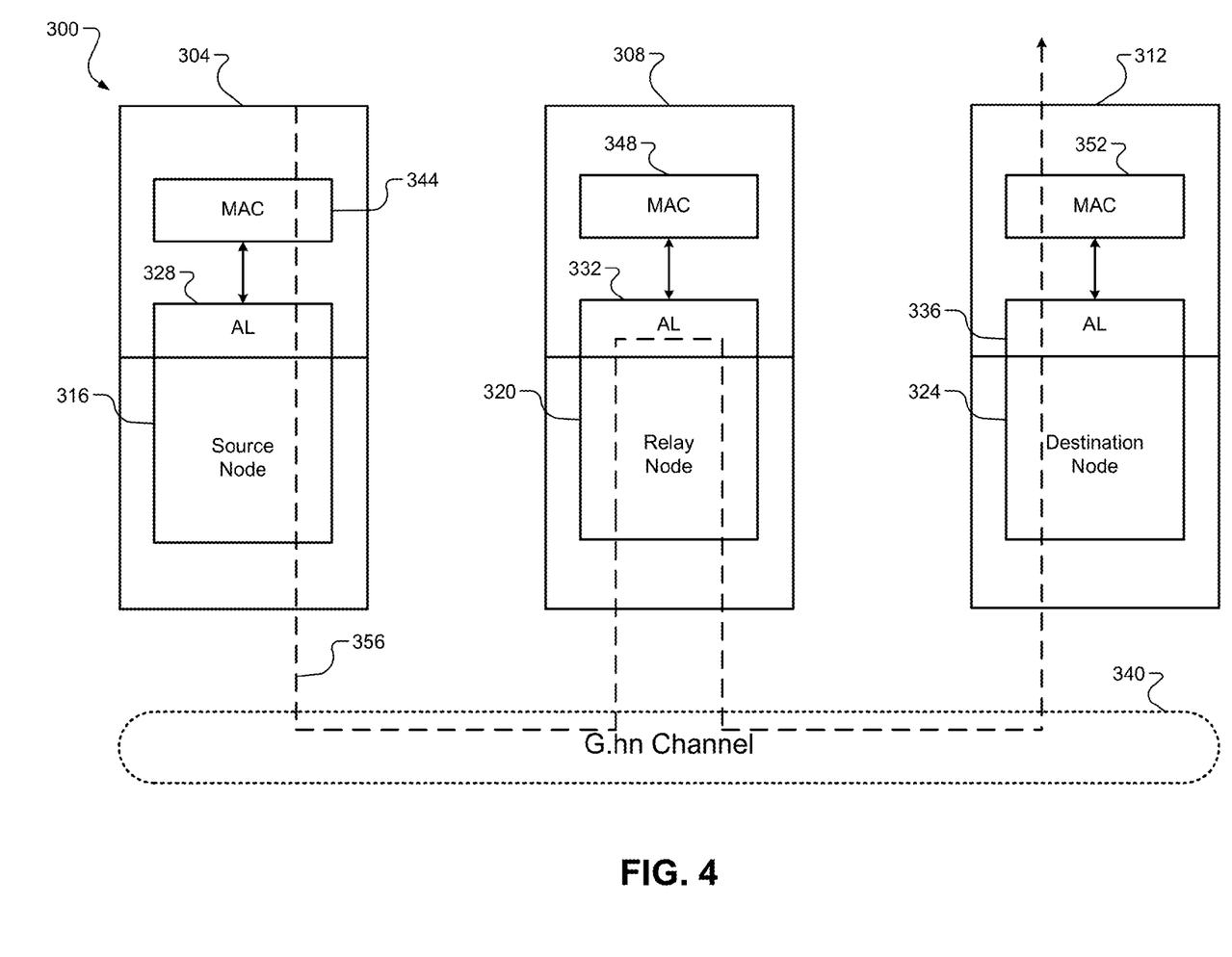
FIG. 4 illustrates a second example relay operation according to the principles of the present disclosure.

FIG. 4 shows the example network 300 with the relay node 320 operating in a second mode. In the second mode, the relay node 320 passes the data packet 356 to the abstraction layer 332. Accordingly, the abstraction layer 332, not the relay node 320, performs actions related to relaying the data packet 356 to the destination node 324.

Conversely, as shown in FIG. 3, the relay node 320 is only configured to relay the data packet 356 directly to the destination node 324 without providing the data packet 356 to the abstraction layer 332. Further, in the second mode, the relay node 320 may be configured to provide the data packet 356 to upper network layers of the device 308 to be transmitted to the device 312 via another type of communication link (e.g., Wi-fi). In other words, the relay node 320 is configured to optionally remove the data packet 356 from the G.hn domain and continue transmission of the data packet 356 and another communication domain.

The source node 316 may determine which node the relay node 320 operates in to relay the data packet 356 to the destination node 324. For example only, in some implementations, the source node 316 may include information (e.g., an indicator) in the data packet 356 that instructs the relay node 320 whether to relay the data packet 356 according to the first mode or the second node. The source node 316 may switch between relay modes on a packet-by-packet basis.

Figure 5:
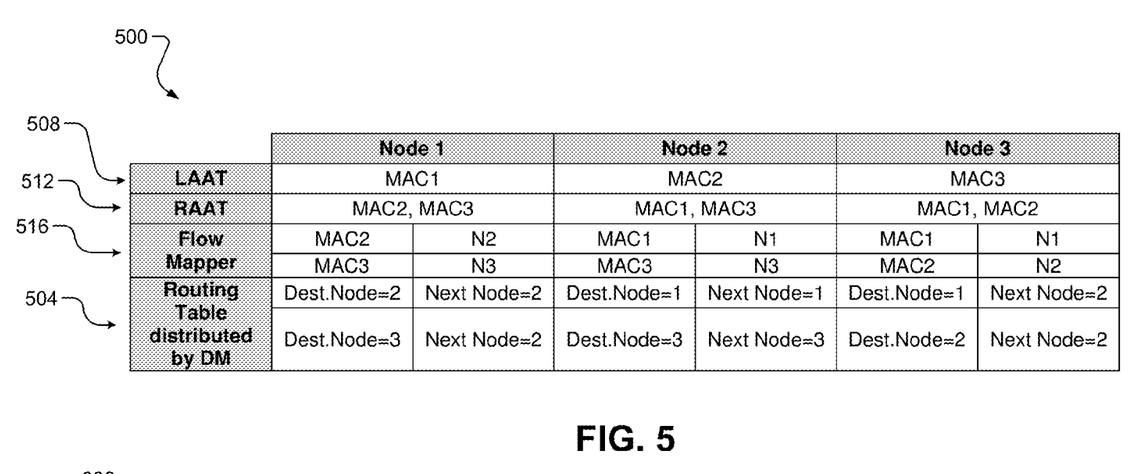
FIG. 5 illustrates a first example relay table according to the principles of the present disclosure.

FIG. 5 shows an example relay table 500, which includes a routing table 504 (e.g., as provided by a domain master), for nodes operating in the first mode. A Local Address Association Table (LAAT) 508 according to the G.hn standard identifies MAC addresses associated with respective nodes (e.g., Nodes 1, 2, and 3, which may correspond to a source node, a relay node, and a destination node, respectively, are associated with MAC addresses MAC1, MAC2, and MAC3, respectively). A Remote Address Association Table (RAAT) 512 identifies remote MAC addresses of others of the nodes. A flow mapper 516 maps each of the MAC addresses to an associated one of the nodes. For example, each of the nodes uses the flow mapper 516 to determine which remote node (1, 2, or 3) to relay a data packet to based on the destination MAC address (MAC1, MAC2, or MAC3) indicated by the data packet.

The routing table 504 indicates a next node to relay the data packet to based on the destination node. For example, if Node 1 receives (or generates) a data packet having a destination node of Node 2, then Node 1 relays the data packet directly to Node 2 (as indicated by Next Node=2 for Destination Node=2 in the routing table 504 for Node 1). In other words, Node 1 may be directly connected to Node 2 via a G.hn connection. However, if Node 1 receives (or generates) a data packet having a destination node of Node 3, then Node 2 still relays the data packet to Node 2 (as indicated by Next Node=2 for Destination Node=3 in the routing table 504 for Node 1). In other words, Node 1may not be directly connected to Node 3 and therefore the data packet must be relayed to Node 3 by Node 2.

If Node 2 receives (or generates) a data packet having a destination node of Node 1, then Node 2 relays the data packet directly to Node 1 (as indicated by Next Node=1 for Destination Node=1 in the routing table 504 for Node 2). In other words, Node 2 may be directly connected to Node 1 via a G.hn connection. Similarly, if Node 2 receives (or generates) a data packet having a destination node of Node 3, then Node 2 relays the data packet directly to Node 3 (as indicated by Next Node=3 for Destination Node=3 in the routing table 504 for Node 3). In other words, Node 1 may also be directly connected to Node 3 and therefore the data packet can be relayed directly to Node 3 by Node 2.

If Node 3 receives (or generates) a data packet having a destination node of Node 2, then Node 3 relays the data packet directly to Node 2 (as indicated by Next Node=2 for Destination Node=2 in the routing table 504 for Node 3). In other words, Node 3 may be directly connected to Node 2 via a G.hn connection. However, if Node 3 receives (or generates) a data packet having a destination node of Node 1, then Node 3 still relays the data packet to Node 2 (as indicated by Next Node=2 for Destination Node=1 in the routing table 504 for Node 3). In other words, Node 3 may not be directly connected to Node 1 and therefore the data packet must be relayed to Node 1 by Node 2.

Figure 6:
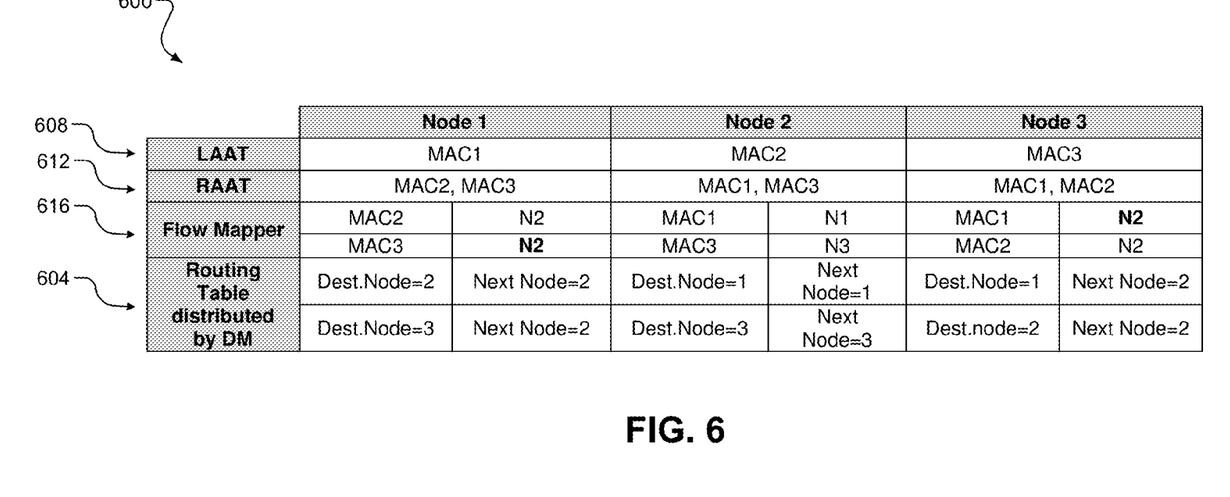
FIG. 6 illustrates a second example relay table according to the principles of the present disclosure.

FIG. 6 shows an example modified relay table 600, which includes a routing table 604, for nodes operating in the second mode. A Local Address Association Table (LAAT) 608 according to the G.hn standard identifies MAC addresses associated with respective nodes (e.g., Nodes 1, 2, and 3, which may correspond to a source node, a relay node, and a destination node, respectively, are associated with MAC addresses MAC1, MAC2, and MAC3, respectively). A Remote Address Association Table (RAAT) 612 identifies remote MAC addresses of others of the nodes. A flow mapper 616 maps each of the MAC addresses to an associated one of the nodes.

However, unlike the flow mapper 516 of FIG. 5, the flow mapper 616 maps both remote MAC addresses for each of Node 1 and Node 3 (e.g., MAC2 and MAC3 for Node 1 and MAC 1 and MAC2 for Node 3) to Node 2. In other words, even if a data packet received by Node 2 from Node 1 has a destination MAC address corresponding to Node 3, the data packet is still configured to be received by Node 2. Conversely, even if a data packet received by Node 2 from Node 3 has a destination MAC address corresponding to Node 1, the data packet is still mapped to Node 2. In this manner, in the second mode data packets are provided to an abstraction layer of Node 2 prior to being relayed to a respective one of Node 1 or Node 3.

Further, the source of the data packet (e.g., the first node) determines whether the data packet destined for the third node is received by the second node or the third node (i.e., whether the data packet is to be relayed according to the second mode or the first mode, respectively). For example, as shown, Node 1 maps the destination address MAC3 to N2. Accordingly, the data packet transmitted to Node 2, to be relayed by Node 2 to Node 3, will first be received by the abstraction layer of Node 2 (when Node 1 determines that the data packet should be relayed in the second mode). Conversely, if Node 1 operates according to the relay table 500 of FIG. 5 (i.e., in the first mode), the destination address MAC3 is mapped to Node 3. Accordingly, the data packet transmitted to Node 2 will be relayed by the PHY layer of Node 2 to Node 3 without being received by the abstraction layer of Node 2. In this manner, the data packet itself received by the relay node (e.g., Node 2 in the present example) controls whether Node 2 relays the data packet according to the first mode or the second mode. For example, the data packet may include an indication of whether the destination node for the destination address MAC3 is Node 2 or Node 1.

As such, in the second mode, each of the nodes 1, 2, and 3 having a 1905.1 abstraction layer is configured to provide all received data packets indicating itself as a destination node to its abstraction layer. In other words, if Node 1 receives a data packet indicating Node 1 as the destination node, then Node 1 is configured to provide the data packet to the abstraction layer of Node 1, regardless of the destination MAC address. If Node 2 receives a data packet indicating Node 2 as the destination node, then Node 2 is configured to provide the data packet to the abstraction layer of Node 2, regardless of the destination MAC address. If Node 3 receives a data packet indicating Node 3 as the destination node, then Node 3 is configured to provide the data packet to the abstraction layer of Node 3, regardless of the destination MAC address.

Figure 7:
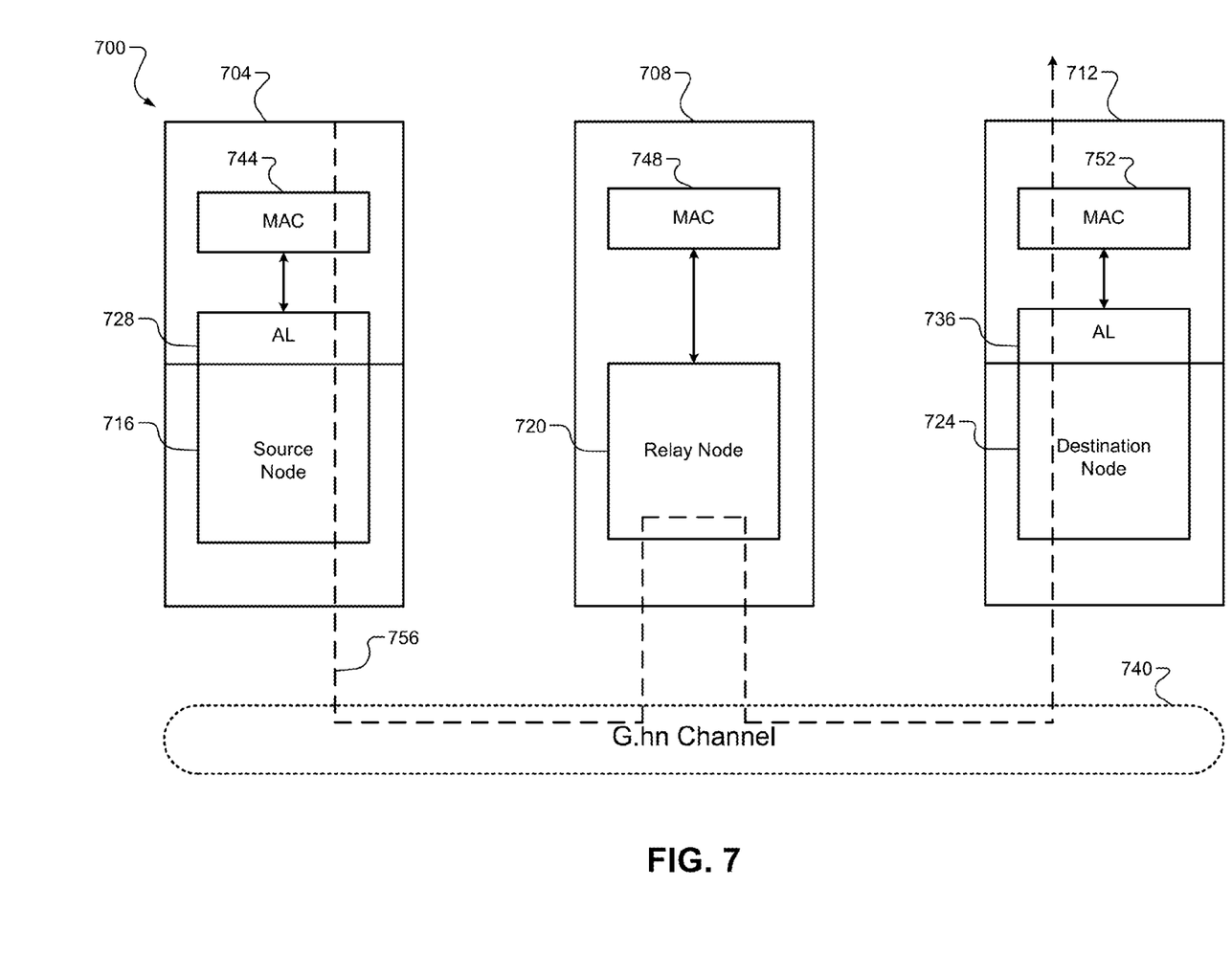
FIG. 7 illustrates a third example relay operation according to the principles of the present disclosure.

FIG. 7 shows an example network 700 including devices 704, 708, and 712, corresponding to a source node 716, a relay node 720, and a destination node 724. Each of the nodes 716 and 724 is 1905.1 compliant and includes a corresponding abstraction layer 728 and 736. The device 708 does not include an abstraction layer. The nodes 716, 720, and 724 communicate via a connection such as a G.hn channel 740. Each of the nodes 716, 720, and 724 as a corresponding MAC address 744, 748, and 752. Because the relay node 720 does not include an abstraction layer (i.e., is not 1905.1 compliant), the relay node 720 may only be configured to operate in the first mode and simply relays a data packet 756 based on a destination MAC address in the data packet 756 and routing information corresponding to the destination MAC address stored in a routing table (e.g., as provided by a domain master). Accordingly, a relay table of the device 708 may be the same as the example relay table 500 as shown in FIG. 5. The source node 716, the destination node 724, and other nodes (not shown) may still be configured to operate in the second mode. For example, any data packets to be relayed by the source node 716 or the destination node 724 may be provided to the corresponding abstraction layers 728 and 736 of the respective nodes prior to being relayed.

Figure 8:
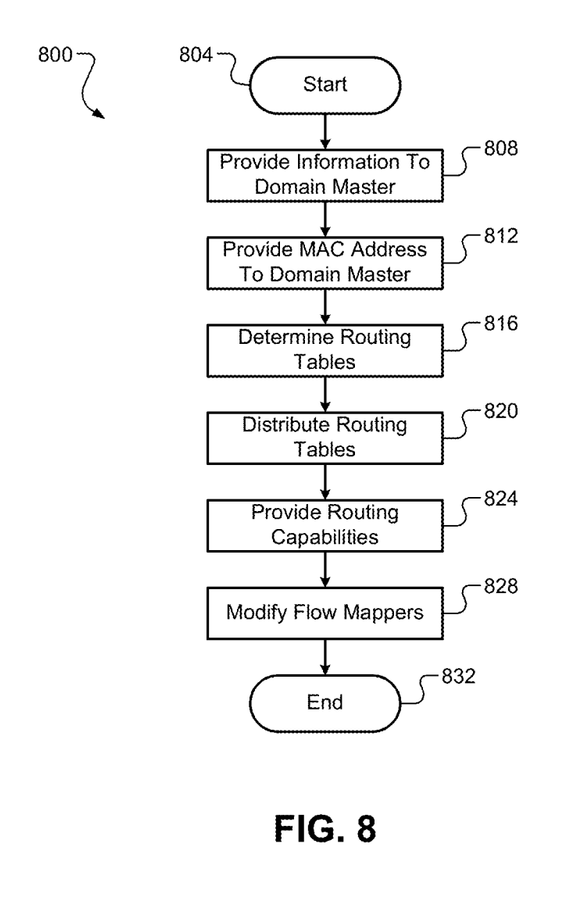
FIG. 8 illustrates an example multimode relay method according to the principles of the present disclosure.

FIG. 8 shows an example multimode relay method 800 beginning at 804. At 808, each node operating in a G.hn domain in a network provides information to a domain master indicating routing capabilities of the node. For example, the information indicates whether the node is configured to operate in only the first mode, in each of the first mode and the second mode, and/or whether the node includes a 1905.1 abstraction layer. At 812, each node provides the respective MAC address of the node to the domain master. At 816, the domain master determines the routing tables for each of the nodes in the network. At 820, the domain master distributes the routing tables to the respective nodes. At 824, the domain master provides information to each of the nodes indicating the routing capabilities of each of the other nodes operating in the network.

At 828, each of the nodes modifies the flow mapper in its relay table according to the routing capabilities of each of the other nodes based on the information provided by the domain master. For example, for each destination MAC address in the relay table, each node modifies a corresponding mapped node in the flow mapper based on whether the next node (i.e., a relay node) is configured to operate in the second mode. In other words, if the relay node is configured to operate in the second mode, then the flow mapper of the source node may be modified to map a destination MAC address of a destination node to the relay node. Conversely, if the relay node is not configured to operate in the second mode, then the flow mapper of the source node is not modified. Accordingly, the mapped nodes in the flow mapper remain the same as the destination nodes in the routing table provided by the domain master. The method 800 ends at 832.

The wireless communications described in the present disclosure can be conducted in full or partial compliance with IEEE standard 802.11-2012, IEEE standard 802.16-2009, IEEE standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2012 may be supplemented by draft IEEE standard 802.11ac, draft IEEE standard 802.11ad, and/or draft IEEE standard 802.11ah.

Further aspects of the present invention relate to one or more of the following clauses.

A device including a first node configured to communicate, over a first connection, with a second node and a third node in a network. The first node includes a first network layer associated with a first communication domain. The first communication domain corresponds to the first connection. A second network layer is associated with the first communication domain and a second communication domain. The first communication domain and the second communication domain are different. The first network layer is configured to receive, from the second node, a data packet to be relayed to the third node, in a first mode, forward the data packet to the third node, and in a second mode, selectively provide the data packet to the second network layer. The second network layer is configured to, in the second mode, forward the data packet to the third node.

In other aspects of the device, the first communication domain is a G.hn domain. The second communication domain is a non-G.hn communication domain. The first network layer corresponds to a physical layer. The second network layer corresponds to a 1905.1 abstraction layer.

In other aspects of the device, to forward the data packet to the third node, the second network layer is configured to select between forwarding the data packet to the third node via the first connection in the first communication domain and forwarding the data packet to the third node via a second connection in the second communication domain. The first node is configured to determine, based on a destination node stored in a relay table, whether to forward the data packet according to the first mode or the second mode. In the first mode, the relay table maps a destination address associated with the third node to the third node, and, in the second mode, the relay table maps the destination address associated with the third node to the first node. To forward the data packet to the third node, the second network layer is configured to forward the data packet to the third node, in the first communication domain, via the first network layer and the first connection.

A method includes, in a first node located in a device, communicating over a first connection with a second node and a third node in a network. A first network layer is located in the first node and is associated with a first communication domain corresponding to the first connection. The method includes, using the first network layer, receiving a data packet from the second node to be relayed to the third node, in a first mode, forwarding the data packet to the third node, and, in a second mode, selectively providing the data packet to a second network layer. The second network layer is associated with the first communication domain and a second communication domain, and the first communication domain and the second communication domain are different. The method further includes, in the second mode, forwarding the data packet to the third node using the second network layer.

In other aspects of the method, the first communication domain is a G.hn domain. The second communication domain is a non-G.hn communication domain. The first network layer corresponds to a physical layer. The second network layer corresponds to a 1905.1 abstraction layer.

In other aspects of the device, forwarding the data packet to the third node includes selecting between forwarding the data packet to the third node via the first connection in the first communication domain and forwarding the data packet to the third node via a second connection in the second communication domain.

In other aspects of the method, the method further includes, using the first node, determining, based on a destination node stored in a relay table, whether to forward the data packet according to the first mode or the second mode. The method further includes, in the first mode, mapping, using the relay table, a destination address associated with the third node to the third node, and, in the second mode, mapping, using the relay table, the destination address associated with the third node to the first node. Forwarding the data packet to the third node includes forwarding the data packet to the third node, in the first communication domain, via the first network layer and the first connection.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium include nonvolatile memory (such as flash memory), volatile memory (such as static random access memory and dynamic random access memory), magnetic storage (such as magnetic tape or hard disk drive), and optical storage.

The apparatuses and methods described in this application may be partially or fully implemented by one or more computer programs executed by one or more processors. The computer programs include processor-executable instructions that are stored on at least one non-transitory, tangible computer-readable medium. The computer programs may also include and/or rely on stored data.

What is claimed is:

1. A first node configured to communicate, over a first connection, with a second node and a third node in a network, the first node comprising a processor and a memory, wherein the memory stores instructions within that, when executed by the processor, cause the first node to:
   control communication between the second node and the third node via (i) a first communication domain, wherein the first communication domain corresponds to the first connection, and (ii) a second communication domain, wherein the second communication domain corresponds to a second connection, and wherein the first communication domain and the second communication domain are different;
   receive, from the second node, a data packet to be relayed to the third node;
   determine, based on a destination node stored in a relay table, whether to forward the data packet according to a first mode or a second mode; and
   forward the data packet to the third node according to a selected one of the first mode and the second mode,
   wherein
      in the first mode, the relay table maps a destination address associated with the third node to the third node, and
      in the second mode, the relay table maps the destination address associated with the third node to the first node.

2. The first node of claim 1, wherein the first communication domain is a G.hn domain.

3. The first node of claim 2, wherein the second communication domain is a non-G.hn communication domain.

4. The first node of claim 1, wherein the processor is configured to execute a 1905.1 abstraction layer.

5. The first node of claim 1, wherein forwarding the data packet to the third node includes selecting between (i) forwarding the data packet to the third node in the first mode via the first connection in the first communication domain and (ii) forwarding the data packet to the third node in the second mode via a second connection in the second communication domain.

6. The first node of claim 1, wherein, forwarding the data packet to the third node is performed in the first communication domain, via the first connection.

7. A method performed by a first node, the method comprising:
- communicating, over a first connection, with a second node and a third node in a network;
- controlling communication between the second node and the third node via (i) a first communication domain, wherein the first communication domain corresponds to the first connection, and (ii) a second communication domain, wherein the second communication domain corresponds to a second connection, and wherein the first communication domain and the second communication domain are different;
- receiving, from the second node, a data packet to be relayed to the third node;
- determining, based on a destination node stored in a relay table, whether to forward the data packet according to a first mode or a second mode;
- forwarding the data packet to the third node according to a selected one of the first mode and the second mode;
- mapping, using the relay table, a destination address associated with the third node to the third node in the first mode; and
- mapping, using the relay table, the destination address associated with the third node to the first node in the second mode.

8. The method of claim 7, wherein the first communication domain is a G.hn domain.

9. The method of claim 8, wherein the second communication domain is a non-G.hn communication domain.

10. The method of claim 7, wherein the first node is configured to execute a 1905.1 abstraction layer.

11. The method of claim 7, wherein forwarding the data packet to the third node includes selecting between (i) forwarding the data packet to the third node in the first mode via the first connection in the first communication domain and (ii) forwarding the data packet to the third node in the second mode via the second connection in the second communication domain.

12. The method of claim 7, wherein forwarding the data packet to the third node includes forwarding the data packet to the third node in the first mode, in the first communication domain, via the first connection.

\* \* \* \* \*